No. 814,130. PATENTED MAR. 6, 1906.
C. J. HARRIS.
ATTACHMENT FOR PNEUMATIC CONVEYERS.
APPLICATION FILED JULY 17, 1905.

Witnesses
W. E. Palmer
M. A. Schmidt

Inventor
Caliway J. Harris
Milo B. Stevens & Co.
Attorneys

UNITED STATES PATENT OFFICE.

CALIWAY JAMES HARRIS, OF MANGHAM, LOUISIANA.

ATTACHMENT FOR PNEUMATIC CONVEYERS.

No. 814,130.  Specification of Letters Patent.  Patented March 6, 1906.

Application filed July 17, 1905. Serial No. 269,981.

*To all whom it may concern:*

Be it known that I, CALIWAY JAMES HARRIS, a citizen of the United States, residing at Mangham, in the parish of Richland and State of Louisiana, have invented new and useful Improvements in Attachments for Pneumatic Conveyers, of which the following is a specification.

My invention relates to a pneumatic gin-feeder, but more particularly an attachment for the mouth of a conveyer to loosen the cotton, so that it will be taken up and fed regular and even.

The cotton when taken to the gin is usually packed so tight in the wagon that it has to be loosened before the conveyer can take it up. This requires the services of one or more persons besides some one to handle the conveyer-tube. The feed is also liable to be irregular, frequently resulting in choking of the conveyer. With the use of this attachment it is not necessary to employ some one to loosen the cotton, as this is done automatically by the attachment when it is carried across the cotton by the conveyer-tube. The attachment therefore results in a saving of labor and also makes the feed regular and more rapid than when feeding by hand.

Figure 1:
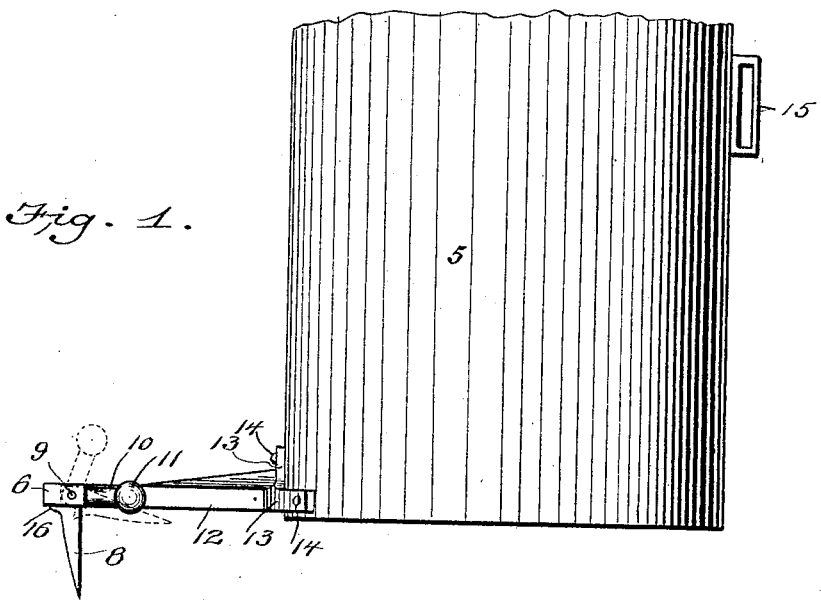
Figure 2:
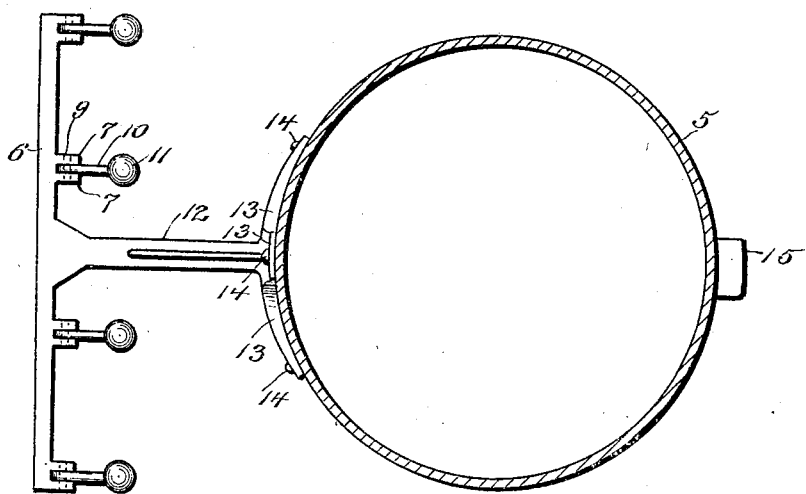

In the accompanying drawings, Figure 1 is an elevation of the conveyer-tube provided with my attachment. Fig. 2 is a plan view.

Referring specifically to the drawings, 5 denotes the lower end or inlet of a pneumatic conveyer-tube. This tube connects with the feeder in the gin-house and delivers the cotton thereto in the usual manner. The invention comprises a rake having a head 6, provided with projecting ears 7, between which the teeth 8 are pivoted, as at 9. At their upper ends the teeth are provided with outwardly-extending arms 10, which have weighted ends 11. The weighted arms cause the teeth to hang normally in a vertical position. The rake-head is formed with a projecting stem 12, provided at its outer end with flanges 13 for securing the rake to the conveyer-tube, said flanges being bolted thereto, as at 14.

The operation of the attachment is as follows: The conveyer-tube is drawn over the load of cotton in the usual manner, a handle 15 being provided for this purpose. As the rake-teeth project below the end of the conveyer-tube, they dig into the cotton and thoroughly loosen the same. When the tube is swung in the opposite direction, the rake-teeth swing on their pivots and rise to a horizontal position, as shown by dotted lines in Fig. 1, so as to pass freely over the cotton that was loosened at the previous stroke. When the mouth of the conveyer-tube passes over the loosened cotton, it is sucked up and conveyed to the feeder. The teeth have shoulders 16, which engage the rake-head and prevent the teeth from swinging rearwardly when they are down in operative position.

If desired, two rakes can be used, which will be arranged on the conveyer-tube diametrically opposite each other, so that when one of the rakes is in operation the teeth of the other will be elevated and pass over the cotton, as heretofore described.

Having thus described my invention, what is claimed as new, and desired to be secured by Letters Patent, is—

1. The combination with a pneumatic conveyer-tube, of a rake carried thereby adjacent the inlet-mouth, said rake having pivoted teeth adapted to swing into inoperative position on the back stroke.

2. The combination with a pneumatic conveyer-tube, of a rake carried thereby adjacent the inlet-mouth, said rake having swinging teeth provided with weights tending to swing the teeth down to engage the same in the material.

In testimony whereof I have signed my name to this specification in the presence of two subscribing witnesses.

CALIWAY JAMES HARRIS.

Witnesses:
E. H. LILLY,
J. C. WEAVER.